Figure 4:
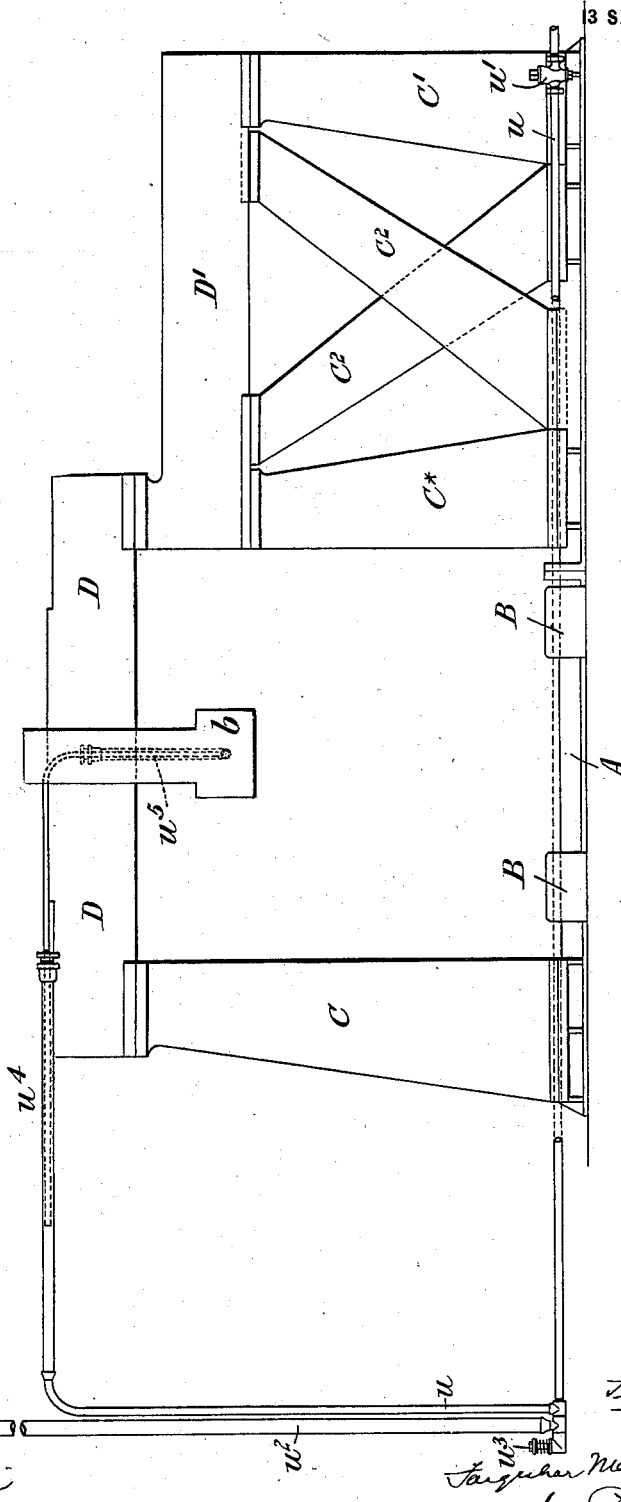

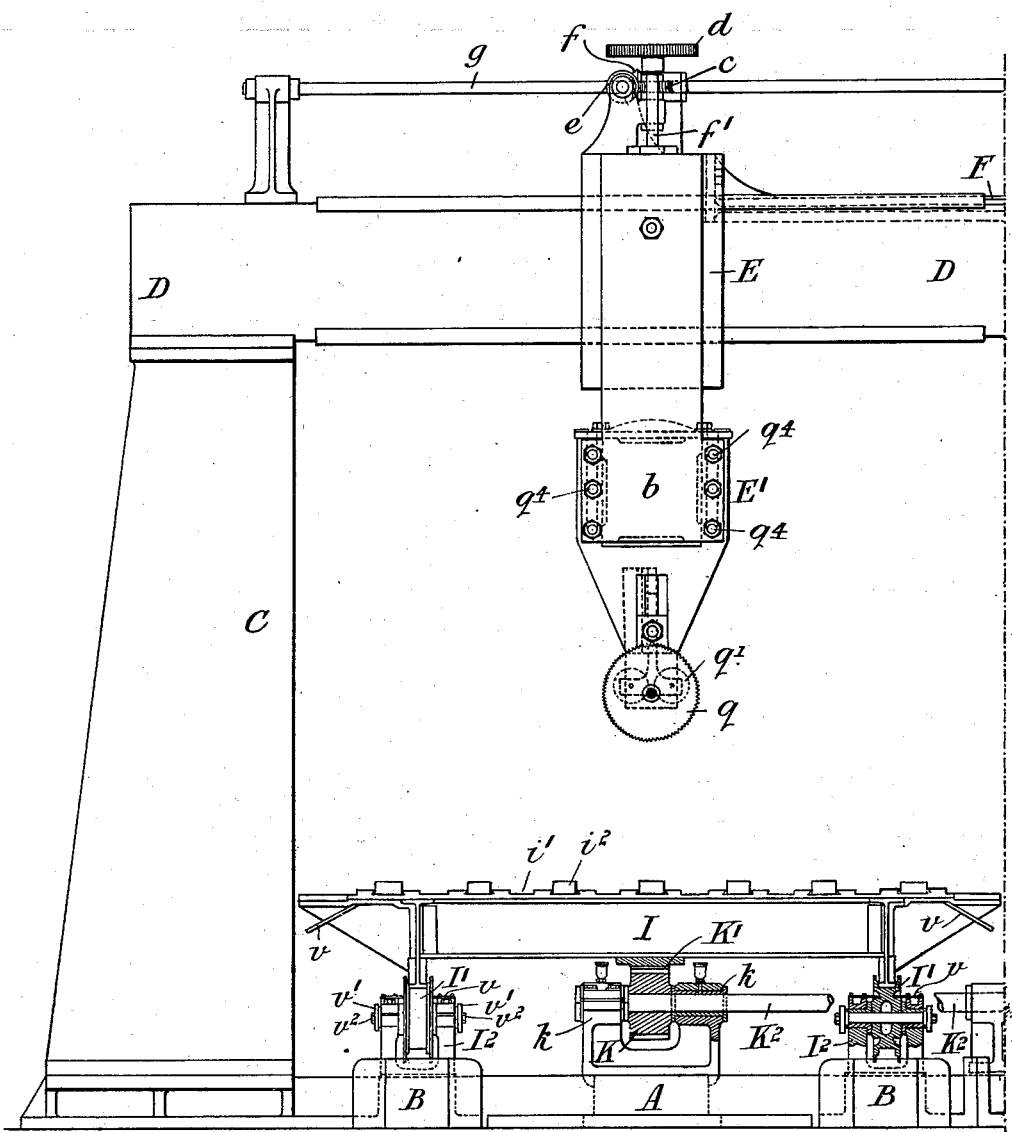

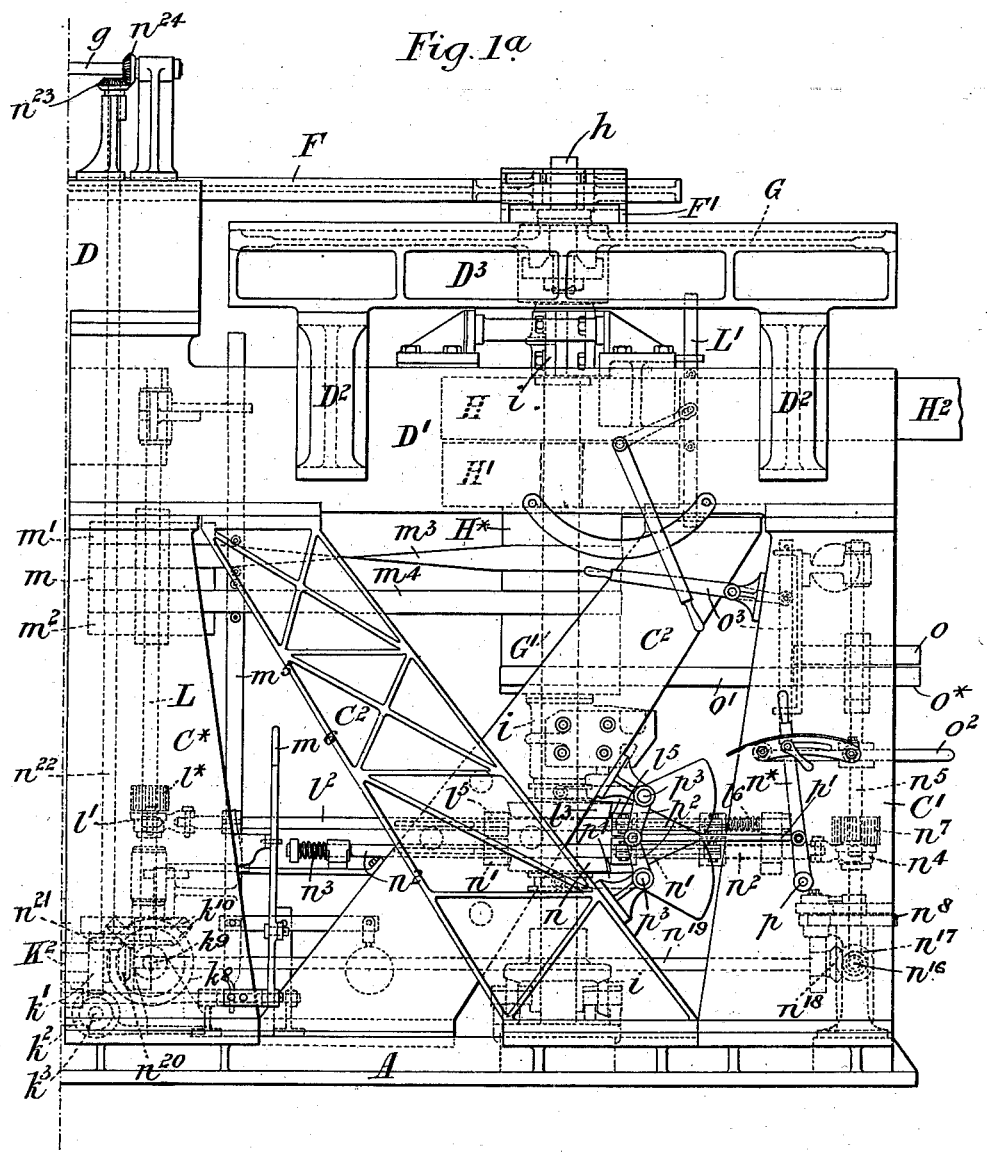

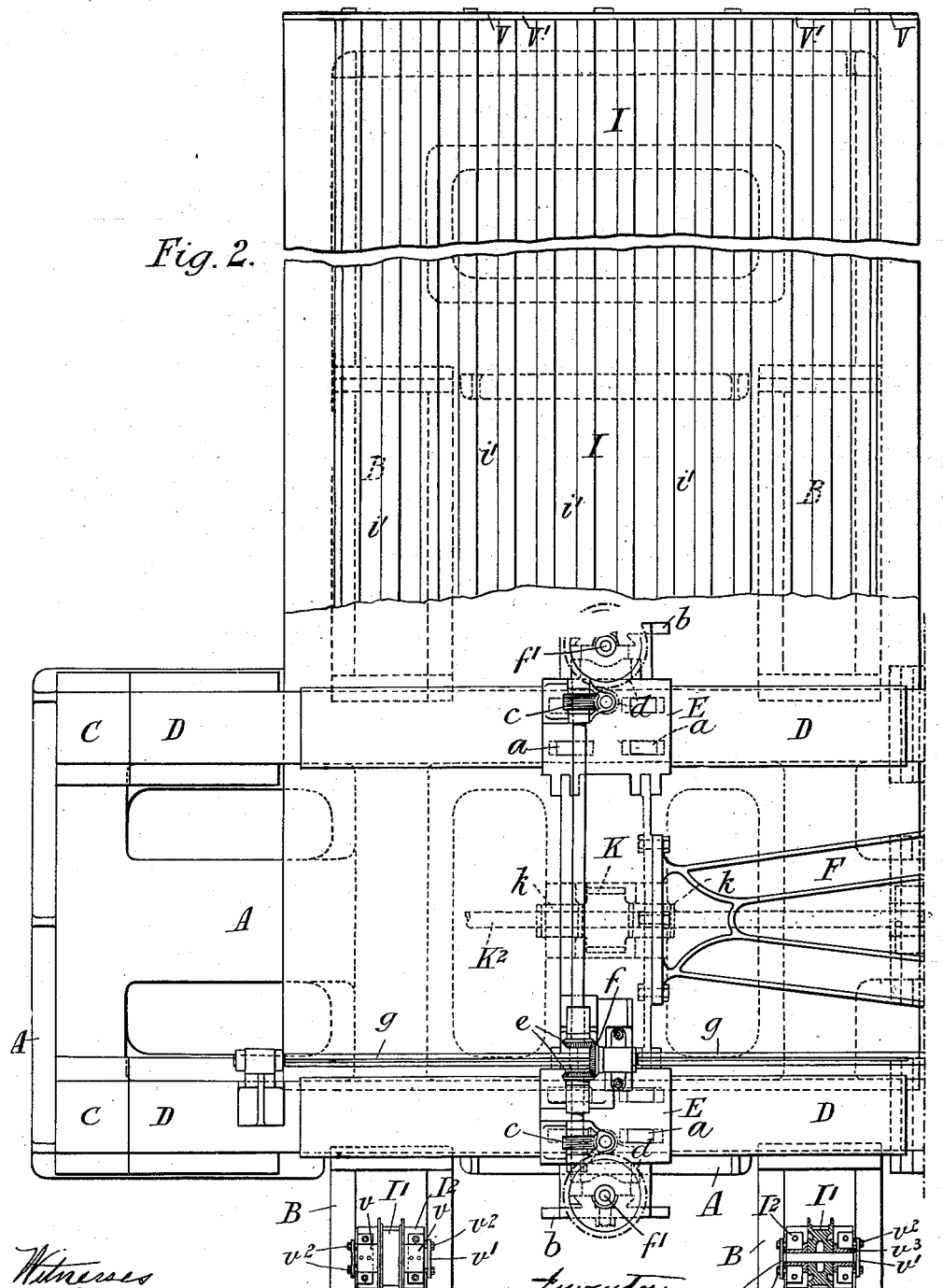

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 4.
Fig. 2ª
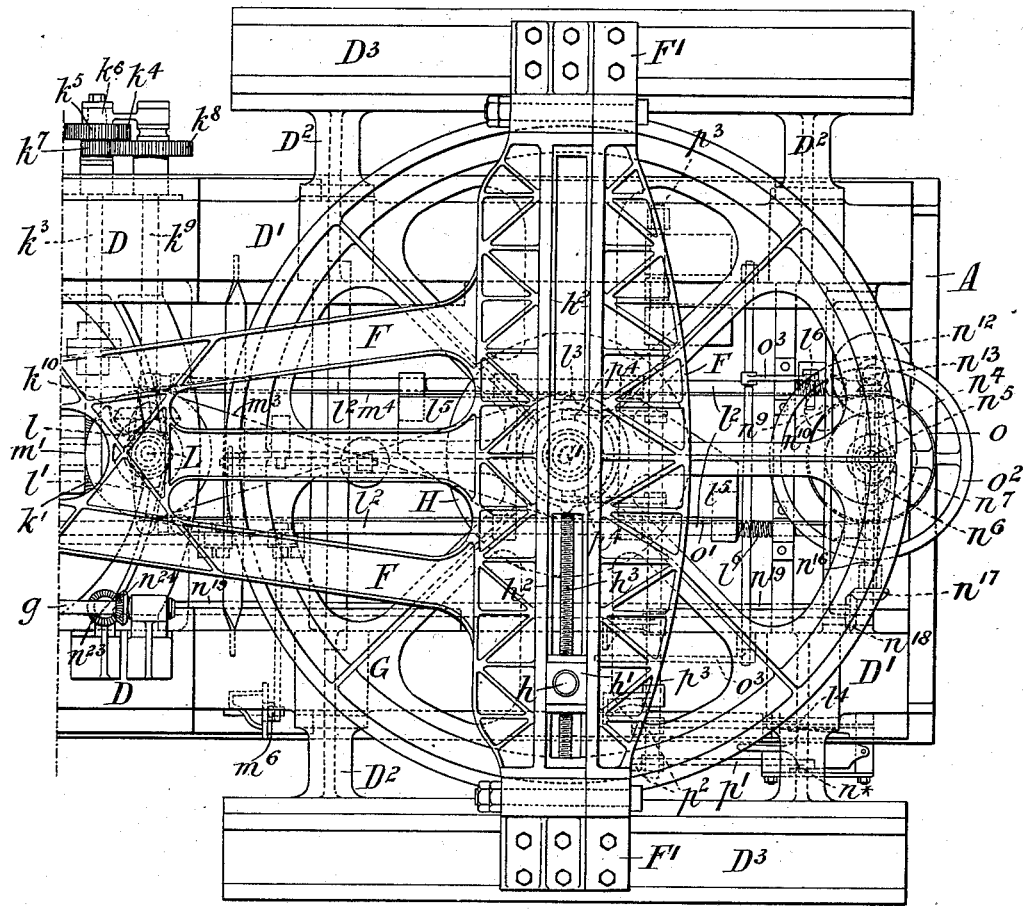

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 5.
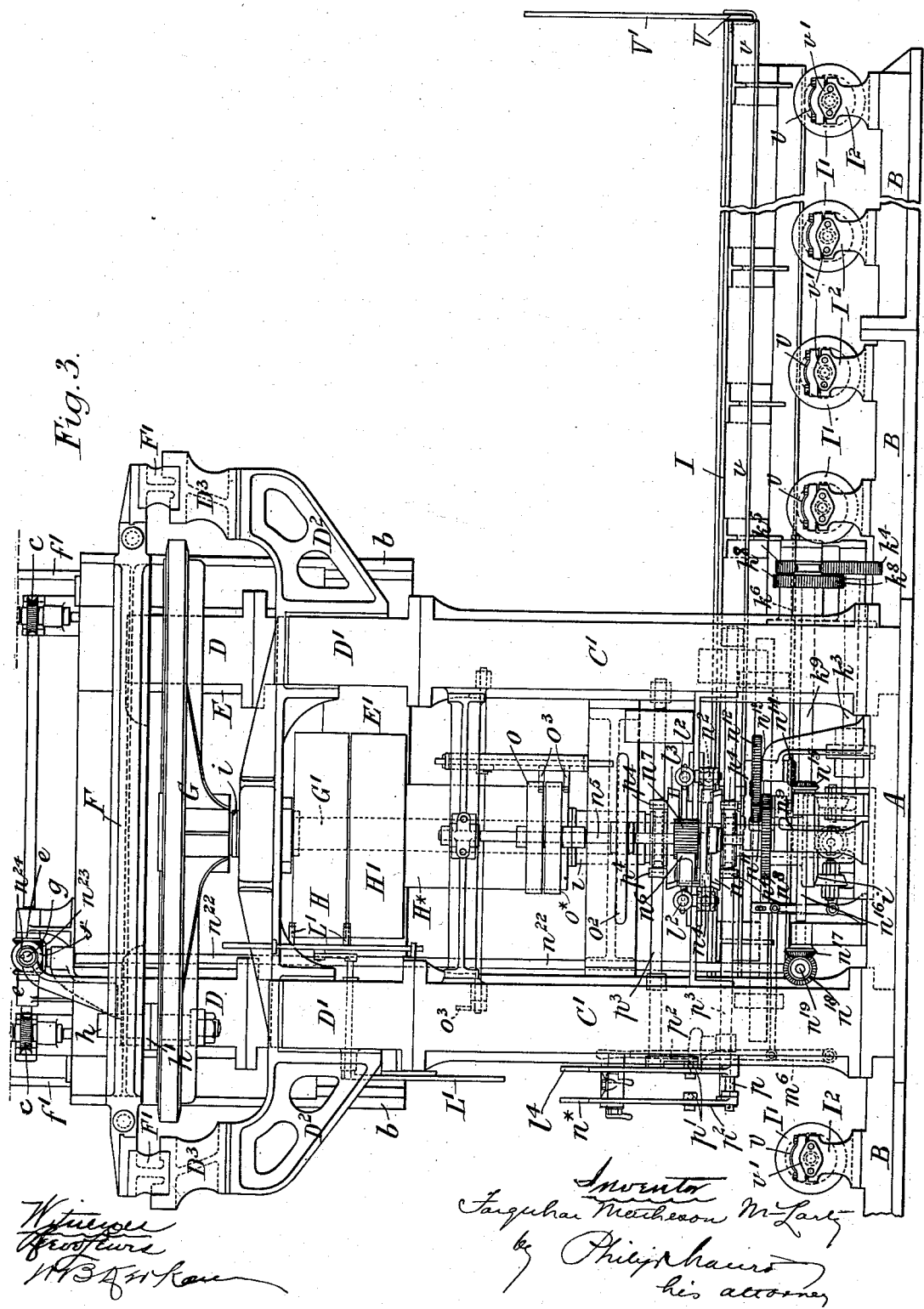

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 3 Sheets—Sheet 6.

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.)
13 Sheets—Sheet 7.
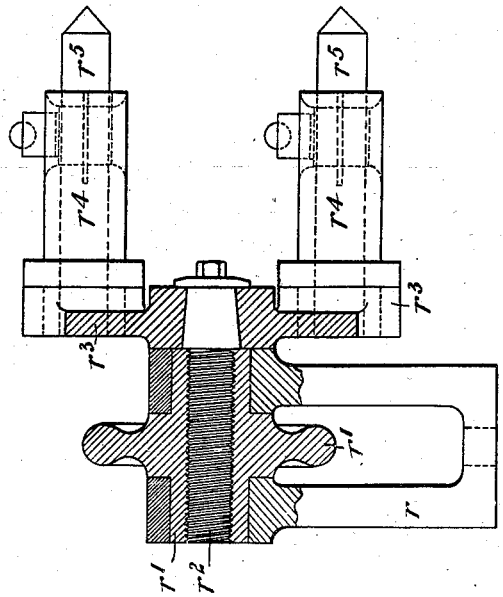
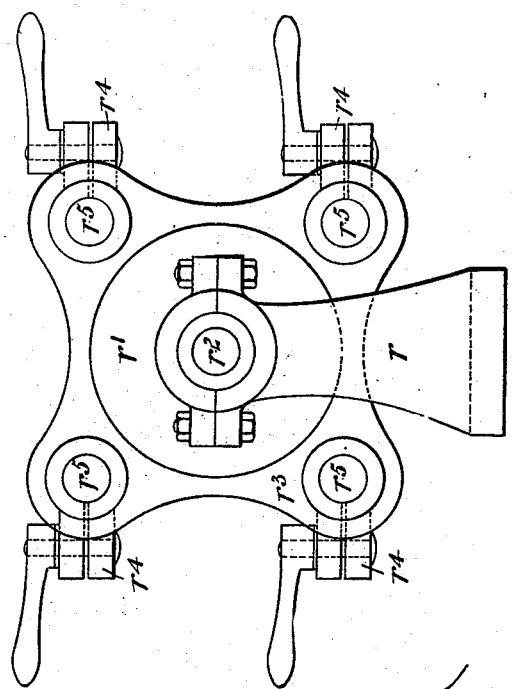

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 8.
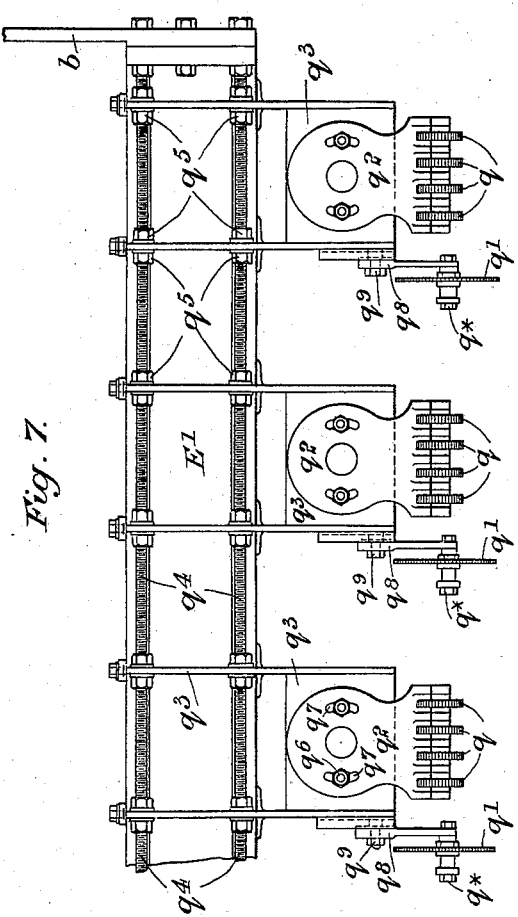

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 9.
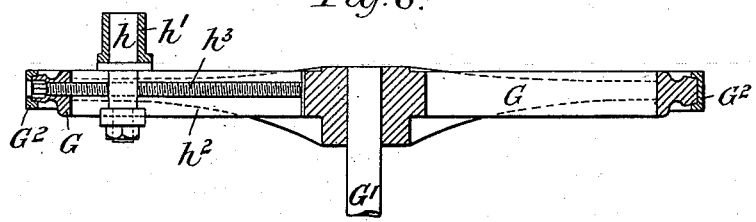
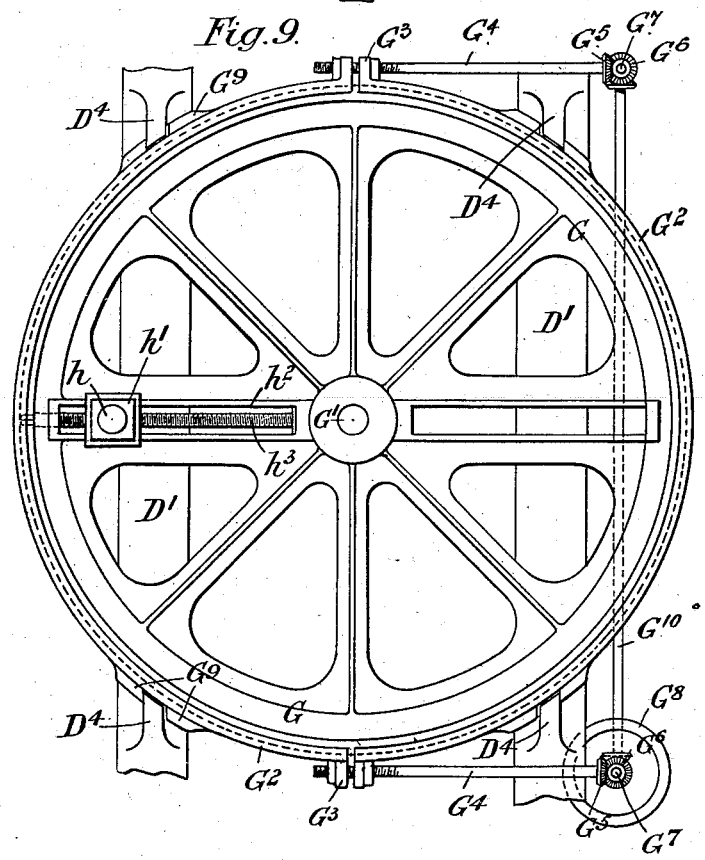

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 10.
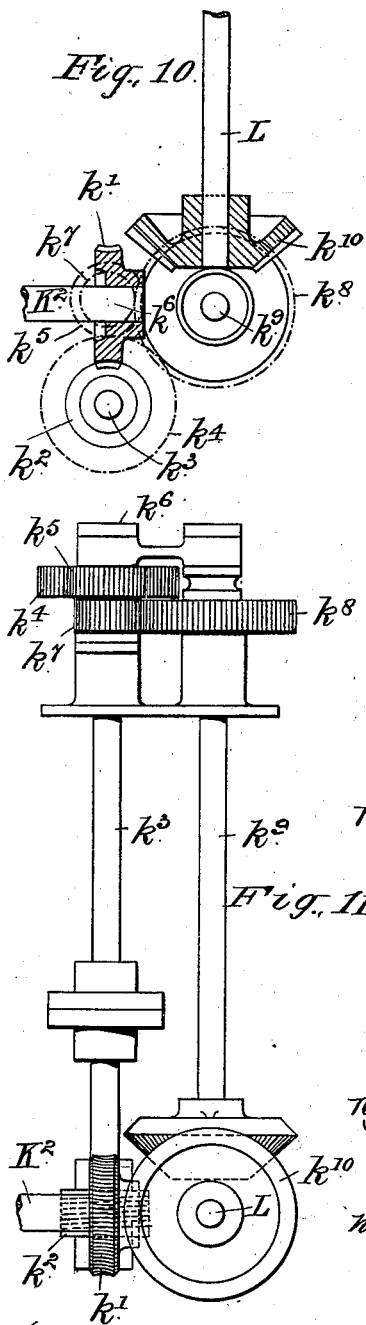
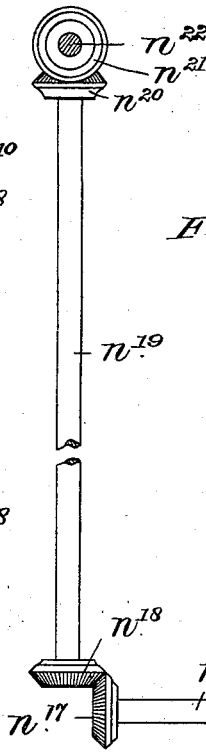
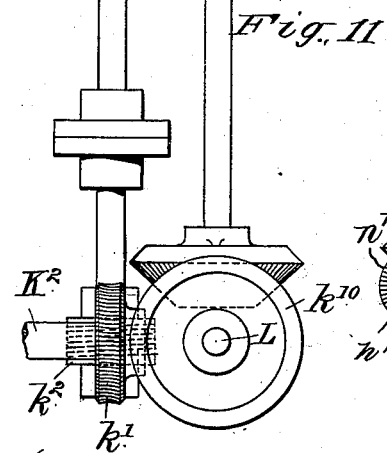
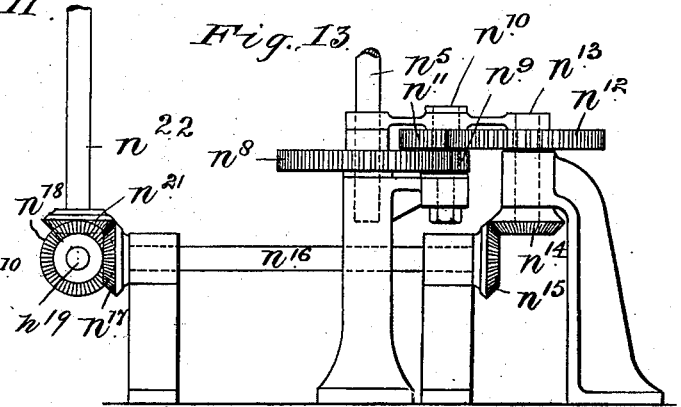

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 11.
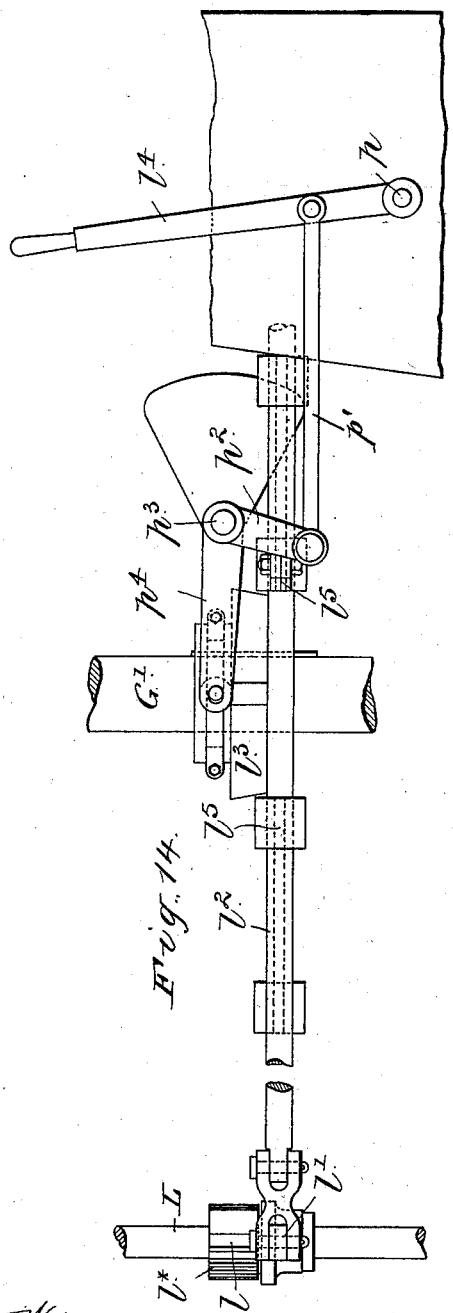
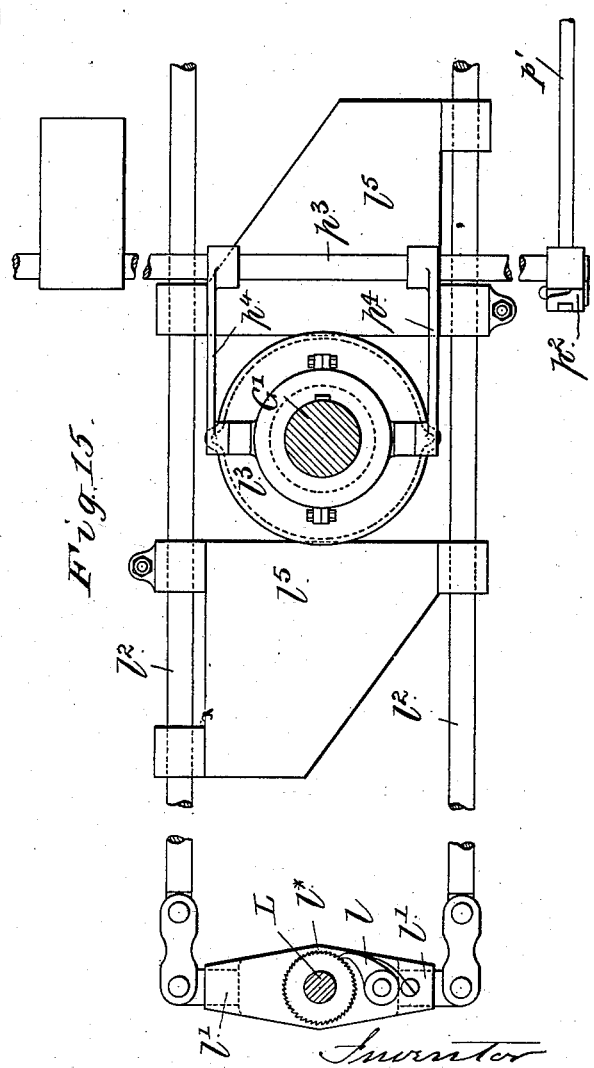

No. 651,767. Patented June 12, 1900.
F. M. McLARTY.
MACHINERY OR APPARATUS FOR DIVIDING, SHAPING, WORKING, OR DRESSING STONE.
(Application filed Jan. 2, 1900.)
(No Model.) 13 Sheets—Sheet 12.

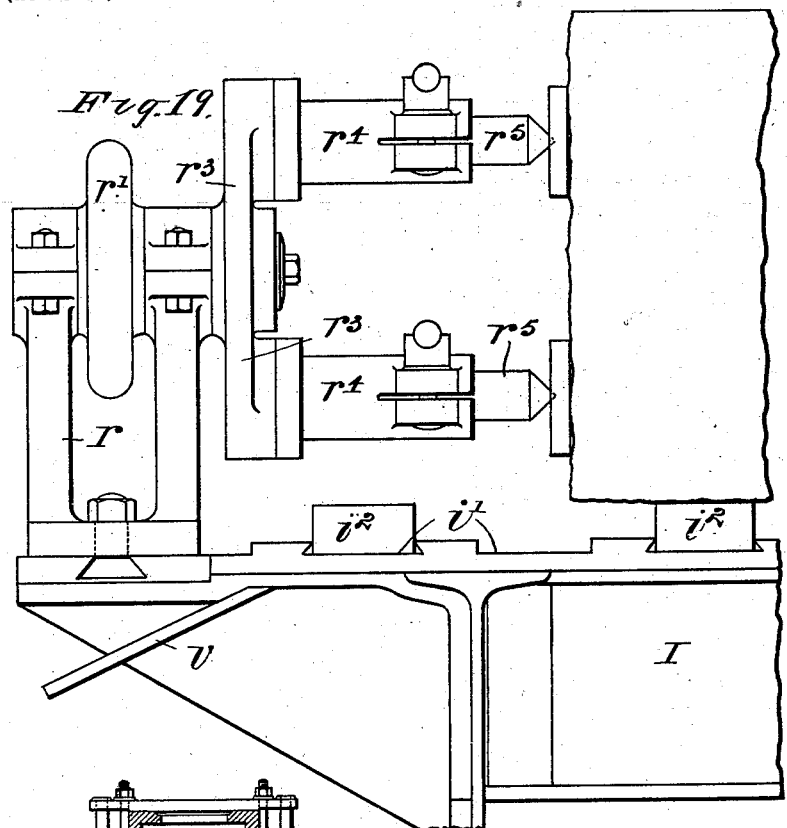
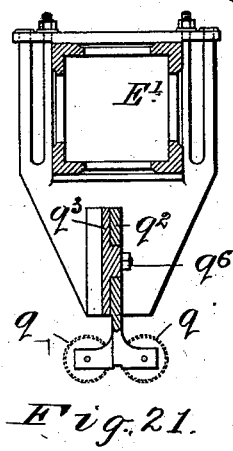
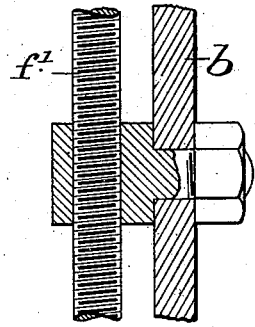

United States Patent Office.

FARQUHAR MATHESON McLARTY, OF GREENOCK, SCOTLAND.

MACHINERY OR APPARATUS FOR DIVIDING, SHAPING, WORKING, OR DRESSING STONE.

SPECIFICATION forming part of Letters Patent No. 651,767, dated June 12, 1900.

Application filed January 2, 1900. Serial No. 138. (No model.)

*To all whom it may concern:*

Be it known that I, FARQUHAR MATHESON MCLARTY, mechanical engineer, a subject of the Queen of Great Britain and Ireland, and a resident of 52 Forsyth street, Greenock, Scotland, have invented certain new and useful Improvements in Machinery or Apparatus for Dividing, Shaping, Working, or Dressing Stone and the Like, (for which I have applied for a British patent, No. 7,520, dated April 10, 1899,) which invention is fully set forth in the following specification.

My invention has for its object to provide a machine or apparatus with alternative attachments for dividing, shaping, working, or dressing stone and the like (I will refer to it as stone) with great facility, rapidity, and economy in time and labor.

My invention is more especially intended for use for operating with tools or cutters working in accordance with the system described in my United States of America Patent No. 633,974, dated September 26, 1899; but it is not limited to that specification.

In a machine made in accordance with my invention the tools or cutters can be carried by holders, as described in my said former specification, these being held in a reciprocating carrier to which rapid reciprocating movement can be imparted, so that the tools act upon the stone carried upon a table, which can be traversed when necessary transversely to the direction of the movement of the tools either to move the table intermittently to as small an extent as may be desirable to feed the work as the operation of dressing or facing proceeds or to move the table ripidly in either direction to bring the work under the tools or remove it from under them or otherwise move it. Means are also provided by which the tools or cutters can when required be adjusted vertically either intermittently to feed the tools or cutters down as the work proceeds—for example, in dividing stone or in facing it at the side or sides—or rapidly to bring the tools or cutters down to or up from the point of attack.

The invention also includes other details and improvements connected with machines or apparatus for dividing, shaping, working, or dressing stone and the like, as hereinafter described with reference to the accompanying drawings, of which—

Figure 16:
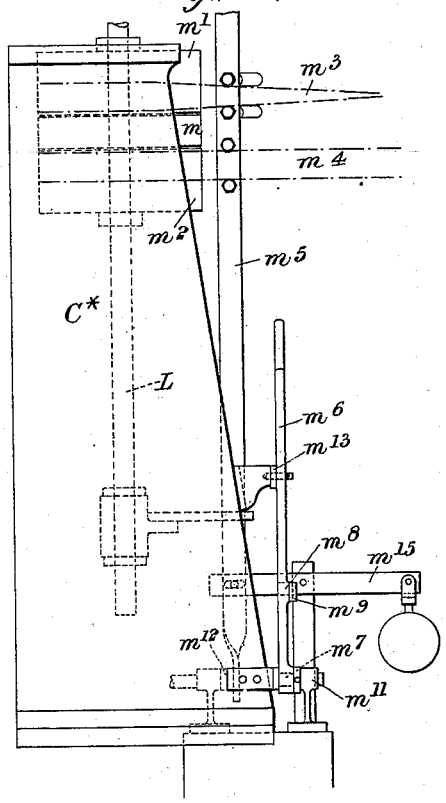
Figure 17:
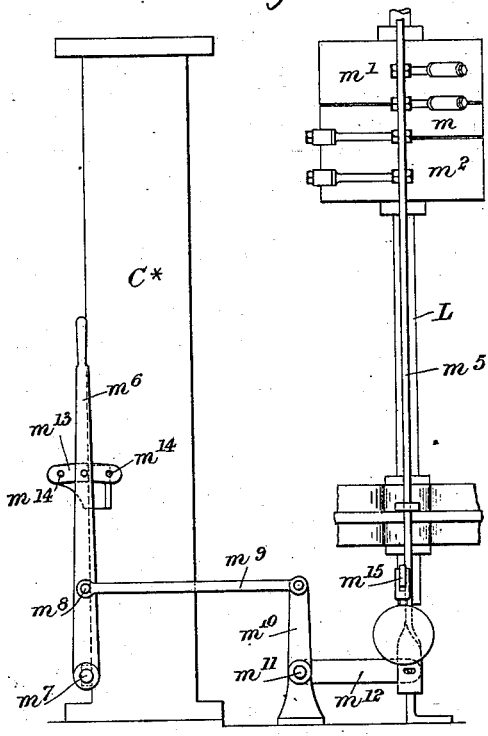
Figure 18:
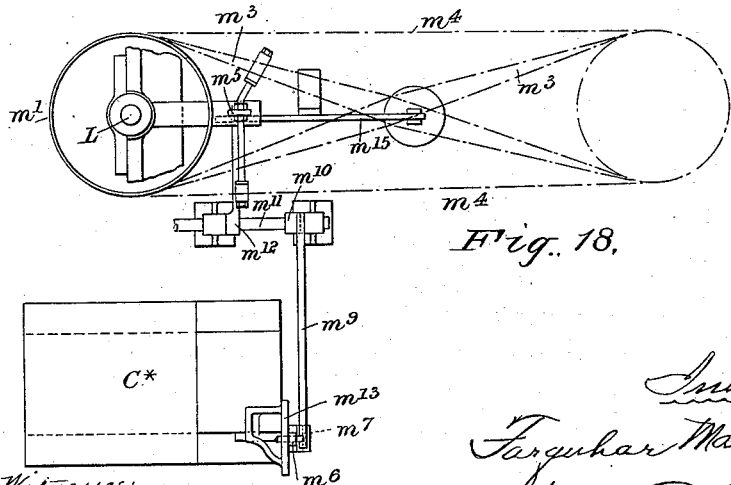

Figures 1 and $1^a$ represent in side elevation, and Figs. 2 and $2^a$ in plan, a stone-dressing machine constructed according to my invention, and Fig. 3 is an end elevation of the same. Fig. 4 is a diagrammatic view of the machine, showing the fluid-distributing arrangement. Figs. 5 and 6 are a front elevation and a vertical section, respectively, of a stone-clamping device. Fig. 7 is an elevation of the tool-holder bar and cutting-tools; and Figs. 8 and 9 represent in vertical section and plan, respectively, the brake mechanism. Figs. 10 and 11 are detail views illustrating the gearing and connections for driving the shaft $K^2$ (through which motion is imparted to the table or carriage I) from the shaft L. Figs. 12 and 13 are similar views of the gearing and connections for driving shaft $n^{22}$ from shaft $n^5$ for imparting vertical movements to the holders for the cutters or dressing-tools. Figs. 14 and 15 are detail views of the mechanism for moving cam $l^3$ vertically on shaft $G'$ and for imparting movement from said cam to shaft L. Figs. 16, 17, and 18 are detail views of the mechanism for shifting the belts $m^3$ and $m^4$. Fig. 19 is a detail view illustrating the manner of applying the devices for securing a piece of stone in place on the table. Fig. 20 is a detail view showing the connection through which screw $f'$ imparts vertical movement to the plates $b$, which carry the holders for the cutters. Fig. 21 is a vertical sectional view through one of the holders shown in Fig. 7, and Fig. 22 is a sectional detail view clearly illustrating one of the troughs V and its splash-board $V'$.

A is a base on which the mechanism is carried, the said base being preferably, though not necessarily, in the form of a cross in plan, parts being built up by removable pieces B, so that the size of the said base can be increased and reduced as required. Bolted to this base are standards C, $C^X$, and $C'$, the standards C $C^X$ supporting girders D, constituting bearers and guides for a saddle-piece E, to which the tool-holder bar E' is attached, while the standards $C^X$ $C'$ support girders $D'$, to which are attached, by brackets $D^2$, girders $D^3$, forming bearers and guides for the rear end of an arm F, through which motion is conveyed to the saddle-piece E. Between the standards $C^{\times}$ $C'$ on each side of the machine are diagonal girders or struts $C^2$, which carry bearings for transverse shafts or rods hereinafter described. The saddle E has rollers $a$, Fig. 2, which run on the girders D, and to the said saddle are fixed vertical plates $b$, to the lower end of which the tool-holder bar E' is attached, the said saddle also carrying helical wheels $c$, change-wheels $d$, and miter-pinions $e$ and $f$, by which the tools are raised and lowered. The pinion $f$ has a feather (see Fig. 3) which can slide along a keyway in a shaft or spindle $g$, through which spindle and the gearing $f\,e\,c\,d$ motion of rotation is imparted to vertical screws $f'$, which work in nuts (see Fig. 20) carried by the slide-plates $b$, and thus raise or lower the said plates according to the direction in which the screws $f'$ are turned. The saddle-piece E also carries part of the mechanism for supplying water to the work, this part of the mechanism being omitted from the main views of the apparatus to prevent confusion, the said mechanism being shown in a separate diagrammatic view of the apparatus in Fig. 4. Reciprocating movements are given to the saddle E by an adjustable crank-pin $h$, carried on a fly-wheel G on the main shaft G', which is mounted in bearings $i$. This shaft carries a fast pulley H and a loose pulley or drum H' and is driven by a strap $H^2$ from any suitable motor, passing around the pulley H. The crank-pin $h$ works within a block $h'$, which engages and slides to and fro in a transverse slot $h^2$ in the arm F when the wheel G is rotated, the said crank-pin imparting reciprocating motion to the said arm. The pin $h$ and block $h'$ are adjustable by means of a screw $h^3$ nearer to or farther from the axis of the wheel G, as required, to vary the stroke of the saddle-piece E. The arm F is provided at F' with guide blocks or rollers which run on the guides or girders $D^3$ and support the principal weight of the said arm.

I is the table on which the stone to be cut or dressed is supported, the said table being mounted on rollers I', carried in bearings $I^2$ on the base A, on which rollers the table can be traversed to and fro to move the stone carried thereby into position beneath the cutting-tools. Traversing movement is given to the table I by means of a pinion K, gearing with a rack K' on the under side of the said table. The said pinion K is fast on a horizontal shaft $K^2$, mounted in bearings $k$, Fig. 1, on the base A, on which shaft is a worm-wheel $k'$ (see Figs. $1^a$, $2^a$, 10, and 11) in gear with a worm $k^2$ on a shaft $k^3$, arranged at right angles to the shaft $K^2$ in suitable bearings on the base A. On the outer end of the shaft $k^3$ is a spur-pinion $k^4$ in gear with a spur-wheel $k^5$ on a stud $k^6$, on which stud is another pinion $k^7$ in gear with a wheel $k^8$ on a shaft $k^9$, arranged parallel to the shaft $k^3$, the said gearing $k^4$, $k^5$, $k^6$, $k^7$, and $k^8$ constituting a system of multiple gearing for varying the speed of traverse of the table. The shaft $k^9$ is driven, by means of miter-wheels $k^{10}$, from a vertical shaft L, on which is fixed a ratchet-wheel $l^{\times}$, with which a pawl $l$ (shown in Figs. $2^a$, 14, and 15) engages, the said pawl being carried on an arm or lever $l'$, loosely mounted on the said shaft L and operated by a pair of rods $l^2$, carrying tappets $l^5$, which are acted on by a cam $l^3$ on the shaft G', on which shaft the said cam is free to slide, but is caused to rotate therewith. The cam $l^3$ is timed so as to impart to the table I, through the gearing hereinbefore described, an intermittent movement at the completion of each stroke of the saddle E. When a rapid continuous movement of the table is required instead of short intermittent movements, the cam $l^3$ is slid along its shaft by means of a handle $l^4$, Figs. 3 and 14, out of range of the tappet $l^5$ on the rods $l^2$, and the strap $H^2$ is shifted, by means of the strap-shifter L', Fig. $1^a$, from the fast pulley H onto the loose pulley or drum H'. Passing around an extension $H^*$ of the loose pulley H' and around pulleys $m$ $m'$ $m^2$ on the shaft L are straps $m^3$ $m^4$, the strap $m^3$ being crossed and the strap $m^4$ being open. The center pulley $m$ is fast on the shaft L, while the other pulleys $m'$ and $m^2$ are loose thereon and are of greater width than the pulley $m$. As shown in the drawings, the strap $m^3$ is on the loose pulley $m'$ and the strap $m^4$ is on the loose pulley $m^2$, so that while the straps are in this position the drum H' can be rotated by the band $H^3$ without giving motion to the table I. The straps $m^3$ $m^4$ are engaged by a strap-shifter $m^5$, which can be operated by means of a lever-handle $m^6$, so as to shift the said straps $m^3$ and $m^4$ in either direction, according to the direction the table I is required to travel, and pass one or the other of the said straps from the loose pulley $m'$ or $m^2$, as the case may be, onto the fast pulley $m$, whereupon motion will be transmitted through the gearing hereinbefore described to the shaft $K^2$ and thence through the pinion K and rack K' to the table I. The lever-handle $m^6$ of the strap-shifter is centered at $m^7$ and is connected at $m^8$, as shown in Figs. 16, 17, and 18, to one end of a rod $m^9$, the opposite end of which rod is connected to an arm $m^{10}$ on a rock-shaft $m^{11}$, on which is another arm $m^{12}$, connected at its outer end to the belt-shifter $m^5$. The lever-handle $m^6$ bears against a bracket $m^{13}$, having therein three holes $m^{14}$, into either of which a pin passed through a hole in the lever-handle $m^6$ can be inserted to retain the said lever-handle in the position to which it has been moved to shift the belts.

$m^{15}$ is a weighted lever to balance the weight of the belt-shifter.

Assuming that the work has been brought into position beneath the cutters, the straps $m^3$ $m^4$ are shifted onto the loose pulleys $m'$ $m^2$ on the shaft L and the driving-strap $H^2$ is shifted onto the fixed pulley H to drive the saddle and tool-holder, and if the stone is to be cut downward the cam $l^3$, which effects the intermittent movement of the table I, is also moved out of range of the tappets $l^5$ on the rods $l^2$, so that the table I, supporting the stone, will remain stationary. The tool-holder bar E' is caused to descend intermittently—that is, at the end of each stroke of the saddle E—so as to cause the cutter to cut deeper and deeper at each succeeding stroke of the said saddle. To effect the intermittent descent of the tool-bar, a cam $n$ similar to the cam $l^3$ is mounted, by means of a spline engaging a groove in the shaft, (see Fig. 15,) so as to turn with, but free to slide on, the shaft G', the said cam $n$ being moved, by means of a lever $n^\times$, into position to act on tappets $n'$, mounted on a pair of rods $n^2$, parallel to the rods $l^2$ in connection with the table-moving mechanism. The mechanism here described with reference to cam $n$ and shown in Figs. 1$^a$ and 3 is substantially the same as the corresponding mechanism with reference to cam $l^3$, (except that the latter is moved downwardly instead of upwardly into operative position,) which is illustrated in detail in Figs. 14 and 15. Each pair of rods $l^2$ and $n^2$ is provided with springs $l^6$ and $n^3$, respectively, which maintain the tappets $l^5$ and $n'$ in contact with their respective cams $l^3$ and $n$. The rods $n^2$ are connected to a lever $n^4$, mounted loosely on a shaft $n^5$ and carrying a pawl $n^6$, in gear with a ratchet-wheel $n^7$, fast on the said shaft, (see Figs. 1$^a$ and 2$^a$,) so that as the main shaft G' rotates the cam $n$, acting on the tappets $n'$, causes the pawl $n^6$ at each half-rotation of the shaft G' to impart, through the wheel $n^7$, partial rotation to the shaft $n^5$. Near the lower end of the shaft $n^5$ is a spur-wheel $n^8$, (see Figs. 12 and 13,) gearing with a pinion $n^9$ on a stud $n^{10}$, which carries another spur-wheel $n^{11}$, gearing with a wheel $n^{12}$ on a short vertical shaft $n^{13}$, this gearing $n^8$ to $n^{12}$ constituting a system of multiple gearing. On the lower end of the shaft $n^{13}$ is a bevel-wheel $n^{14}$, in gear with a corresponding wheel $n^{15}$ on a horizontal shaft $n^{16}$, which also carries another bevel-wheel $n^{17}$, in gear with a corresponding wheel $n^{18}$ on a horizontal shaft $n^{19}$, arranged at right angles to the shaft $n^{16}$. On the other shaft $n^{19}$ is a bevel-wheel $n^{20}$, gearing with a corresponding wheel $n^{21}$ on the lower end of a vertical shaft $n^{22}$, on the upper end of which shaft is a bevel-wheel $n^{23}$, (see Fig. 3,) gearing with a similar wheel $n^{24}$ on the shaft $g$, hereinbefore described, through which and the gearing $f\ e\ c\ d$ the vertical screws $f'$ are rotated to raise and lower the tool-holder bar E'. On the shaft $n^5$ are fast and loose pulleys $o\ o^\times$, around which passes a driving-strap $o'$ from the extension H$^\times$ of the loose pulley or drum H' on the shaft G'. On the shaft $n^5$ is a hand-wheel $o^2$, by which the raising and lowering of the tool-holder bar can be effected by hand without throwing the arm F out of action; but when it is required to rapidly raise the said tool-holder bar the pulleys H H' can be coupled together and then the strap $o'$ be shifted by the strap-shifter $o^3$, Figs. 3 and 1$^a$, from the loose pulley $o$ to the fast pulley $o^\times$ on the shaft $n^5$, whereby motion will be imparted, through the gearing hereinbefore described, to the vertical screws $f'$ and the tool-holder bar E will be raised into position to act on the top of the work on the table I. The hand-levers $l^4$ and $n^\times$, hereinbefore referred to, for bringing into position the cams $l^3$ and $n$ are mounted on a stud $p$, (see Figs. 1$^a$, 14, and 15,) and the said levers are connected by rods or bars $p'$ to arms $p^2$ on rods or shafts $p^3$, mounted in bearings carried on the struts C$^2$, on which shafts are other arms $p^4$, engaging in annular grooves in the bosses of the cams $l^3$ and $n$, so that by means of the levers $l^4$ and $n^\times$ either cam can, as required, be brought into position to act on their respective tappets $l^5\ n'$.

The cutting-tools shown on the drawings are of the kind described in my United States patent hereinbefore referred to and are mounted in holders adjustably secured to the tool-bar holder E'; but other kinds of tools may be employed, according to the material to be acted on and the speed of the machine may be regulated as required. In Figs. 7 and 21 two kinds of cutters are shown as being carried by the same tool-holder bar E', those lettered $q$ being surfacing-cutters and those lettered $q'$ being grooving or dividing cutters. The cutters $q$ are shown in clusters mounted to rotate on spindles carried in plates $q^2$, each of which is centered to a frame $q^3$, supported on screws $q^4$, carried by the tool-holder bar E', secured to the vertical slidable plates $b$. (See Fig. 2.) The frames $q^3$ are adjustable along the screws $q^4$ and fixable in position by nuts $q^5$. The plates $q^2$ are each angularly adjustable on the frame $q^3$, and they can be fixed in their adjusted position by nuts $q^6$, screwing onto bolts on the frame $q^3$, which bolts pass through curved slots $q^7$ in the plate $q^2$. Each cutter $q'$ is mounted so as to be free to rotate on a stud $q^\times$ on a plate $q^8$, the said plate being adjustably fixed to the frame $q^3$ by a bolt and nut $q^9$, the bolt having a dovytail-shaped head fitting a correspongle-shaped groove in the frame $q^3$, (see Fig. 7,) so that the plate $q^8$ may by means of the bolt and nut $q^9$ be fixed in its adjusted position.

The stone to be operated on by the cutters is supported on the table I, the said table being provided on its upper surface with dovetail grooves $i'$, in which are inserted adjustable blocks $i^2$, Figs. 1 and 19, on which the stone bears. The grooves $i'$ receive bolts for securing to the table clamping devices such as shown in Figs. 5 and 6 on a large scale for holding the stone in position. Each clamping device comprises a frame $r$, in which is revolubly mounted a screw-threaded nut $r'$, engaging a screw $r^2$, to which is secured a head or plate $r^3$, carrying split clamping-sockets $r^4$, in which are adjustably secured pointed or chisel-ended dogs $r^5$, which are forced into contact with the stone or with a plate interposed between the stone and the points of the dogs by turning the nut $r'$.

The machine is provided with an arrangement for supplying water or other fluid to the tools to keep them cool and to the stone to drive away debris, the said arrangement being shown in Fig. 4, and consists of a supply-pipe $u$, having a cock $u'$, and an air vessel $u^2$ for regulating the flow of the fluid, a relief-valve $u^3$ being provided to prevent the possibility of excessive pressure. The supply-pipe $u$ is provided with telescopic arrangements $u^4\ u^5$ to enable the connection between the said pipe and the tool-carrier and adjacent reciprocating parts to be constantly maintained throughout their various positions. The various bearings and parts which would be liable to injury by grit or other deleterious matter from the stone being operated on are protected by deflecting or guard plates $v^5$, Fig. 1, which divert the grit and the like from the said parts, and on the ends of the table I troughs V are provided, (see Figs. 2 and 22,) into which water supplied to the stone can enter and be conducted thereby sidewise clear of the machine. Splash-boards V' of any suitable height may be inserted in the troughs to prevent fluid splashing from the machine. In addition to the guards or shield-plates $v$, arranged over the bearings of the rollers I', on which the table I travels, the ends of the axles of these rollers are each covered by a plate or cap $v'$, (see Figs. 1, 2, and 3,) which are caused by bolts $v^2$ to press bushes $v^3$, in which the axles of the rollers turn, close against the said rollers, so as to prevent the possibility of grit gaining access to the bearings.

Figs. 8 and 9 represent in vertical section and plan, respectively, an arrangement for stopping the machine at any part of the stroke of the tools or cutters, the said arrangement consisting of a trough-shaped band $G^2$, surrounding the fly-wheel G, the said band being made in two semicircular parts having lugs $G^3$ internally screw-threaded, with which engage right and left handed screw-threads on shafts $G^4$. On each of the shafts $G^4$ is a bevel-wheel $G^5$, in gear with a similar wheel $G^6$ on a vertical shaft $G^7$, which shafts may be rotated by hand by means of a hand-wheel $G^8$, mounted on either of the vertical shafts $G^7$, which shafts are geared together by miter-wheels and horizontal shaft $G^{10}$. The band $G^2$ is supported and prevented from rotating by means of lugs or brackets $D^4$, projecting from or secured to the girders D' and engaging with projections $G^9$ on the exterior of the band $G^2$. The band $G^2$ would in the event of the fracture or breakage of the wheel G prevent the parts from being thrown outward by centrifugal force.

Having now particularly described and ascertained the nature of my said invention and in what manner the same is to be performed, I declare that what I claim is—

1. In a machine for cutting or dressing stone or other material, the combination of a rigid main frame, a vertical driving-shaft, a fly-wheel on the said shaft, a crank-pin and means for adjusting it radially on the fly-wheel, an arm having a slot engaged by the crank-pin, guides on the main frame for the arm, a saddle-piece connected to the arm, guides on the main frame for the saddle-piece, a tool-holder bar, carried by the saddle-piece, screws on the tool-holder bar, a frame such as $q^3$ adjustable on the screws, means for retaining the said frames in position, on the screws, tool-carrying plates adjustable on the said frames, a table for supporting the material to be operated on, rollers on which the table travels, a toothed rack on the table, a pinion engaging the said rack, ratchet mechanism, a cam on the main driving-shaft for imparting intermittent movements to the table, mechanism for rendering the cam inoperative, fast and loose pulleys on the main shaft for the main driving-band, an extension on the loose pulley, crossed and open belts on the said extension, fast and loose pulleys on a counter-shaft for the crossed and open belts, a belt-shifter for the said belts, gearing operatively connecting the counter-shaft and the shaft carrying the table-traversing pinion before mentioned, for imparting continuous motion to the table, a second cam on the main shaft, a counter-shaft, ratchet-gear on the counter-shaft in operative connection with the cam for imparting intermittent motion to the counter-shaft, shafts, gearing and screws for transmitting motion from the said counter-shaft to the tool-holder, mechanism for rendering the cam inoperative, fast and loose pulleys on the said counter-shaft, a belt for the said pulleys for imparting continuous movement to the counter-shaft, a shifter for the belt, grip for the material to be operated on, means for adjusting the grips on the table and up to the material, and means for directing fluid onto the material and the tools, substantially as hereinbefore described.

2. In a machine for cutting or dressing stone or the like, the combination with a reciprocatory tool-carrier, of means for imparting reciprocating motions thereto, the said means comprising a fly-wheel and means for driving the same, a crank on the fly-wheel, a longitudinally-movable arm connected with the reciprocatory tool-carrier and having a transverse slot therein in which the crank-pin loosely engages, and guides in which said arm is movable longitudinally but which prevent lateral movement thereof.

3. In a machine for cutting or dressing stone or the like, the combination with a work-carrying table, of means for imparting traversing movement thereto comprising a main continuously-rotating driving-shaft, a counter-shaft and means for driving the table therefrom, two independent connections between the driving and counter shafts, one for imparting a continuous rapid movement to the latter in either direction and the other for imparting a slow intermittent feed movement thereto, and means for throwing said connections into and out of operation.

4. In a machine for cutting or dressing stone or the like, the combination with a work-carrying table, a rack on the table, a main driving-shaft and means for rotating the same, a counter-shaft, a pinion engaging the rack on the table, and gearing for driving the pinion from the counter-shaft; of means for rotating the counter-shaft to impart continuous reciprocating movements to the table in either direction, said means comprising fast and loose pulleys on the counter-shaft, a pulley on the main driving-shaft, crossed and open belts on said pulleys, and a shifter for the belts; and means for intermittently rotating the counter-shaft from the main shaft to impart intermittent feed movement to the table.

5. In a machine for cutting or dressing stone or the like the combination with a work-carrying table of means for imparting intermittent movements thereto comprising a main driving-shaft, a cam on the said shaft, tappet mechanism operated by the cam, a counter-shaft, pawl-and-ratchet gear operatively connecting the counter-shaft and the tappet mechanism, a system of gearing in operative connection with the counter-shaft, a pinion in operative connection with the gearing, and a rack on the work-carrying table engaging with the said pinion, substantially as herein set forth.

6. In a machine for cutting or dressing stone or the like, the combination with a work-carrying table, a main shaft and a cam on the shaft, and intermediate mechanism for imparting intermittent movements to the said table, of lever mechanism for moving the cam axially on the shaft into and out of its operative positions: substantially as set forth.

7. In a machine for cutting or dressing stone or the like, the combination with a horizontally-reciprocating carriage and means for reciprocating the same, of a tool-carrier vertically movable on said carriage and means for imparting continuous vertical movement thereto, comprising a main driving-shaft, a belt-pulley on the said shaft, a counter-shaft, fast and loose pulleys thereon, a belt for the said pulleys, a shifter for the belt, a system of gearing in operative connection with the counter-shaft, screws engaging with the tool-carrier the said screws being in operative connection with the gearing substantially as set forth.

8. In a machine for cutting or dressing stone or the like the combination with a horizontally-reciprocating carriage and means for reciprocating the same, of a tool-carrier vertically movable on said carriage and means for imparting intermittent vertical movement thereto, comprising a main driving-shaft, a cam on the said shaft, tappet mechanism operated by the said cam, a counter-shaft, pawl-and-ratchet gear operatively connecting the counter-shaft and the tappet mechanism, a system of gearing in operative connection with the counter-shaft and screws engaging with the tool-carrier in operative connection with the gearing as herein set forth.

9. In a machine for cutting or dressing stone, or the like, the combination with a reciprocating tool-carrier, a main shaft, and a cam on the shaft and intermediate mechanism actuated thereby for imparting intermittent movements to the said tool-carrier, of lever mechanism for moving the cam axially on the shaft into and out of its operative positions substantially as set forth.

10. In a machine for cutting or dressing stone or the like, the combination with a reciprocating work-carrying table, rollers supporting the same, and an axle and bearings for each roller, of guard-plates for preventing access of dirt and grit to said bearings, one above the bearing at each end of the axle and projecting into a recess in the side of the roller, and one secured over each end of the axle where it projects through the bearings.

11. In a machine for cutting or dressing stone or the like the combination with a work-table a gripping device for holding the work on the table comprising a bracket fixable to the table, a screw-threaded nut revoluble in the bracket a screw-threaded rod engaged by the nut, a plate or disk carried by the rod split sockets on the plate or disk and chisel-ended or pointed studs clamped in the sockets substantially as set forth.

In testimony whereof I have signed this specification in the presence of two subscribing witnesses.

FARQUHAR MATHESON McLARTY.

Witnesses:
WILLIAM FREDERICK UPTON,
PERCY READ GOLDRING.